United States Patent

Lehmann et al.

[11] Patent Number: 6,007,143
[45] Date of Patent: Dec. 28, 1999

[54] DETACHABLY FASTENED REAR MOUNTING FOR A MOTOR VEHICLE

[75] Inventors: Klaus-Peter Lehmann, Mühlacker; Markus Schmid, Mönsheim, both of Germany

[73] Assignee: Dr. Ing. h.c.F. Porsche AG, Weissach, Germany

[21] Appl. No.: 08/921,056

[22] Filed: Aug. 29, 1997

[30] Foreign Application Priority Data

Aug. 29, 1996 [DE] Germany ............................ 196 36 316

[51] Int. Cl.⁶ ...................................................... B60J 7/22
[52] U.S. Cl. ........................................ 296/180.1; 296/136
[58] Field of Search ................................ 296/136, 180.1

[56] References Cited

U.S. PATENT DOCUMENTS

| | | | |
|---|---|---|---|
| 322,103 | 12/1885 | Wernig et al. | 296/136 |
| 1,767,447 | 6/1930 | Griffith | 296/136 X |
| 3,154,341 | 10/1964 | Booth | 296/136 X |
| 3,172,695 | 3/1965 | Bordinat, Jr. | 296/136 X |
| 3,223,446 | 12/1965 | Coppock et al. | 296/136 |
| 3,332,717 | 7/1967 | Amesbury | 296/136 |
| 3,510,165 | 5/1970 | Adams | 296/136 |
| 4,512,606 | 4/1985 | Trostle et al. | 296/136 |
| 4,890,876 | 1/1990 | Gaines | 296/180.1 X |
| 5,211,718 | 5/1993 | Gotz et al. | 296/180.1 |
| 5,322,337 | 6/1994 | Rawlings et al. | 296/136 |
| 5,810,424 | 9/1998 | Kuttner et al. | 296/180.1 |

FOREIGN PATENT DOCUMENTS

| | | | |
|---|---|---|---|
| 2696982 | 4/1994 | France | 296/136 |
| 8523831U1 | 11/1985 | Germany . | |
| 3812469 | 10/1989 | Germany | 296/136 |
| 9111779U1 | 4/1992 | Germany . | |
| 2049571 | 12/1980 | United Kingdom | 296/136 |

OTHER PUBLICATIONS

Office Action Apr. 9, 1995 Germany.3

*Primary Examiner*—Joseph D. Pape
*Attorney, Agent, or Firm*—Evenson, McKeown, Edwards & Lenahan, P.L.L.C.

[57] ABSTRACT

A rear mounting having two scoop elements is detachably fastened in the rear cutout of a convertible vehicle by way of fastening elements. The scoop elements are constructed to be separable in a longitudinal center plane so that, in an in-use position on the vehicle, the two scoop elements form a connected unit and, in a transport position, these scoop elements can be stowed in the vehicle in a mutually detachable and separate manner.

12 Claims, 4 Drawing Sheets

DETACHABLY FASTENED REAR MOUNTING FOR A MOTOR VEHICLE

BACKGROUND AND SUMMARY OF THE INVENTION

This application claims the priority of German application 196 36 316.0 on Aug. 29, 1996.

The invention relates to a detachably fastened rear mounting for a motor vehicle having two scoops arranged behind the front seats.

From German Patent Document DE 85 23 831 U1, a vehicle having a rear mounting is known which has two scoops which are arranged behind the front seats and in which the rear mounting is constructed in one piece.

It is an object of the invention to provide a rear mounting which can be detachably fastened on a vehicle body and can be transported in the vehicle in a space saving manner.

According to the invention, this object is achieved by an arrangement wherein in an in-use position, the rear mounting includes two scoop elements which are connected to form a unit and can be fastened on the vehicle, and, in a transport position, the scoop elements can be divided in the longitudinal direction of the vehicle in a center plane and are constructed to be individually storable in the vehicle.

Principal advantages achieved by means of the invention are that the rear mounting is divided into two scoop elements and each scoop element can be individually stowed in the vehicle. Because of the division, the rear mounting can be transported in a space-saving manner because the elements can be distributed according to the available space in the vehicle or in the trunk. They are preferably accommodated in the rearward trunk.

In an in-use position, the two scoop elements of the rear mounting can be connected with one another on their longitudinal center edges by way of hooking elements in the form of strips. A fastening on the vehicle preferably takes place by way of a slide-in strip or slide-in strip pieces which in a clamping manner receive an edge area of a rear cutout edge between one another. Forward lateral sections of the rear mounting are, for example, connected with the vehicle body by way of fastening elements for a hardtop which exists on the vehicle.

In a transport position, the rear mounting with the two scoop elements is demounted from the vehicle in such a manner that the lateral fastenings are first detached from the vehicle and then the mounting is pulled out of the rear cutout, and then the two scoop elements are separated from one another in that the hooking elements are detached from one another. Preferably, the scoop elements are removed individually.

Preferably, it is also possible to use only one scoop element on the vehicle in an in-use position, the additional scoop element being stored in the vehicle. The space without the scoop element can be provided with a corresponding covering.

Other objects, advantages and novel features of the present invention will become apparent from the following detailed description of the invention when considered in conjunction with the accompanying drawings.

DETAILED DESCRIPTION OF THE DRAWINGS

Figure 1:
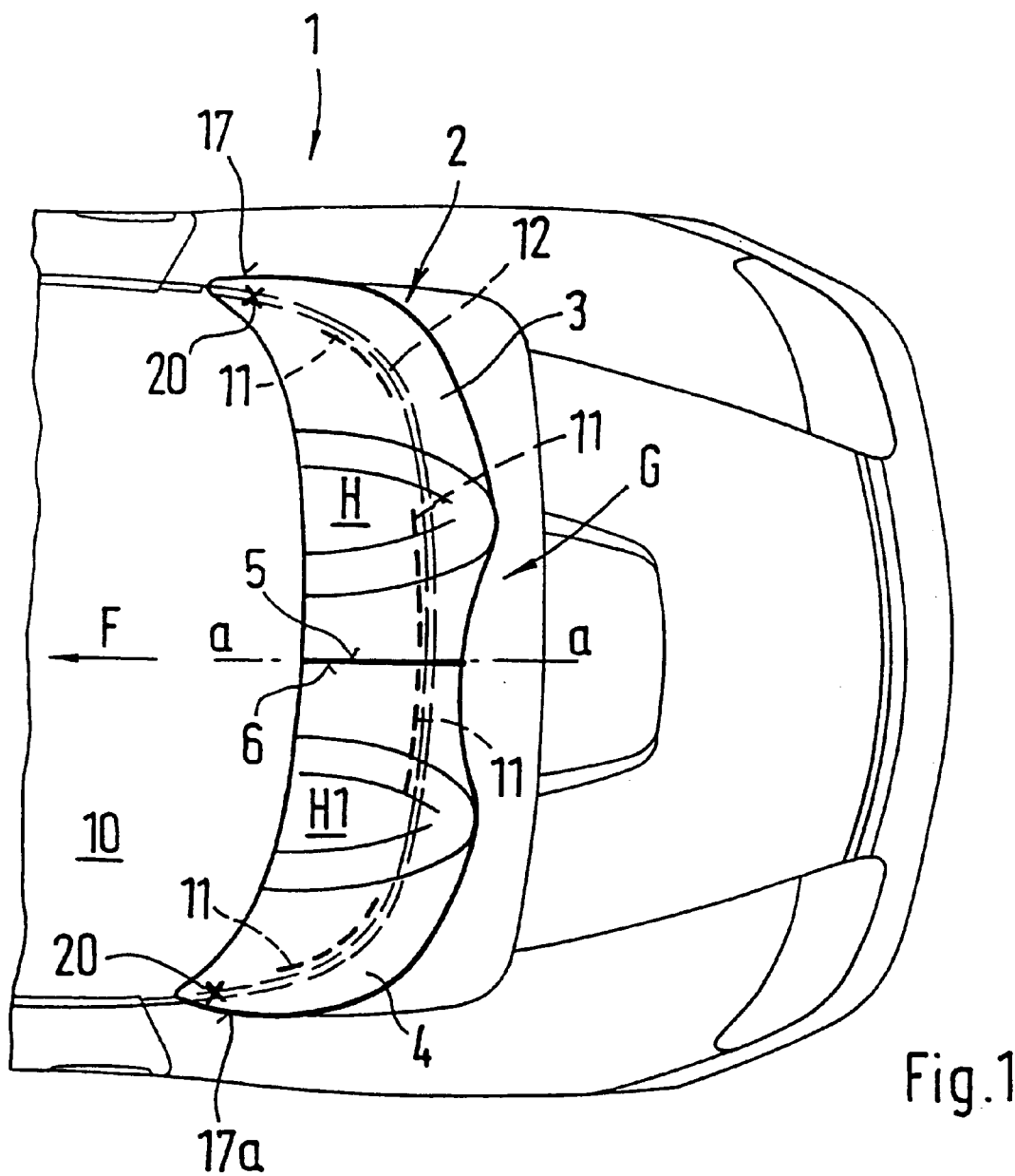
FIG. 1 is a schematic top view of a rear structure of a motor vehicle with a rear mounting which is arranged in the in-use position and has two scoop elements, constructed according to a preferred embodiment of the present invention.
Figure 2:
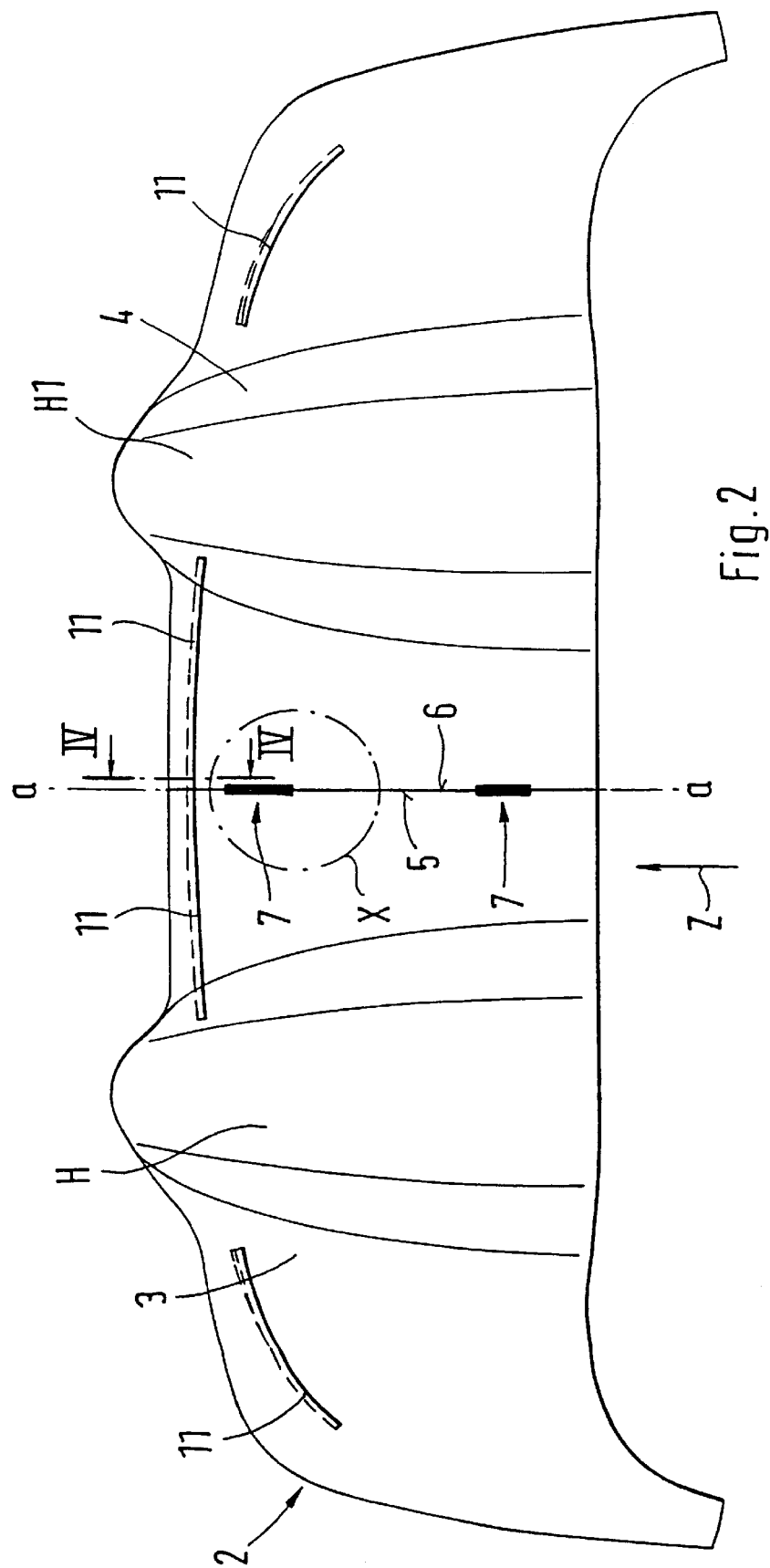
FIG. 2 is a top view of the rear mounting of FIG. 1 with outlined hooking elements and slide-in strips.
Figure 3:
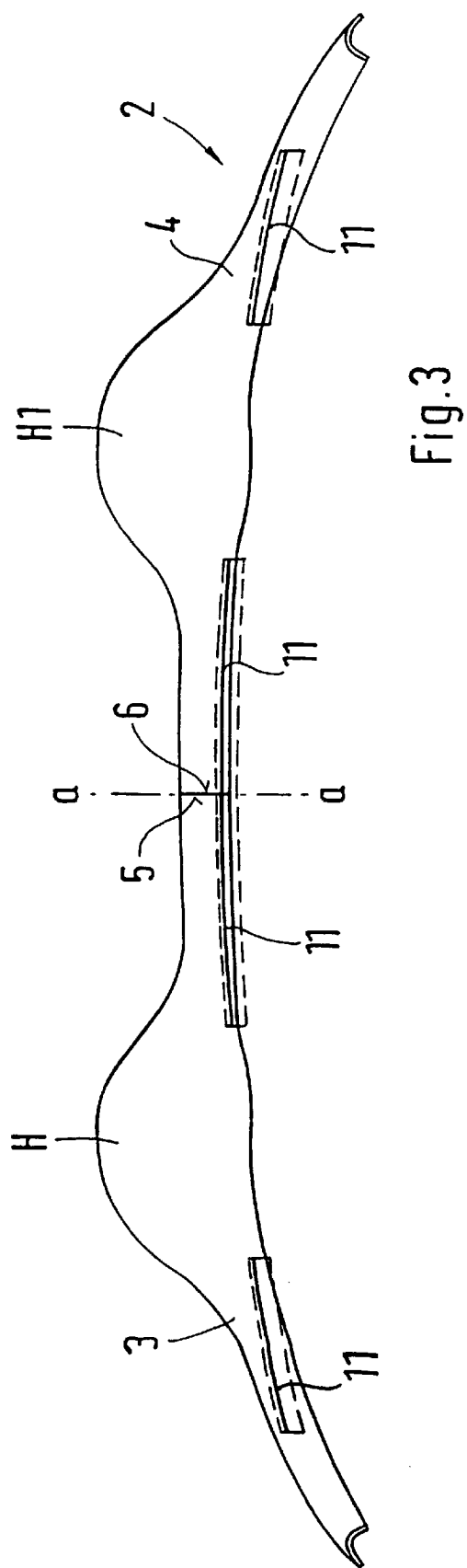
FIG. 3 is a view of the rear mounting viewed in the driving direction Z of FIG. 2.

Behind front seats, a vehicle 1 has a rear mounting 2 which comprises two scoop elements 3 and 4 which are detachably connected with one another in the longitudinal center plane a—a. In an in-use position G (FIG. 1), the rear mounting 2 is in one piece and in a transport position, it is divided into two separate scoop elements 3 and 4, which is not shown.

Figure 5:
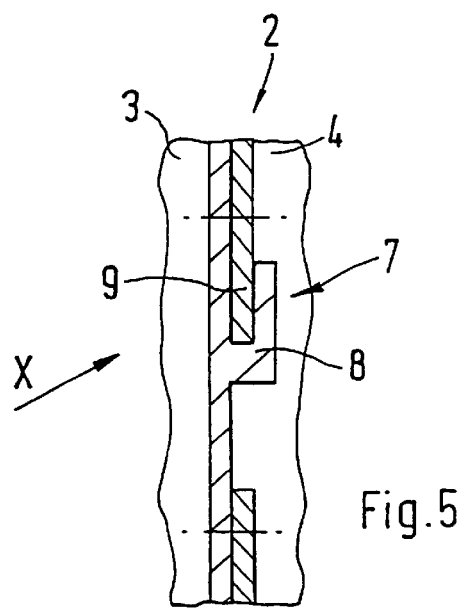
FIG. 5 is an enlarged detail X of the hooking element according to FIG. 2.
Figure 6:
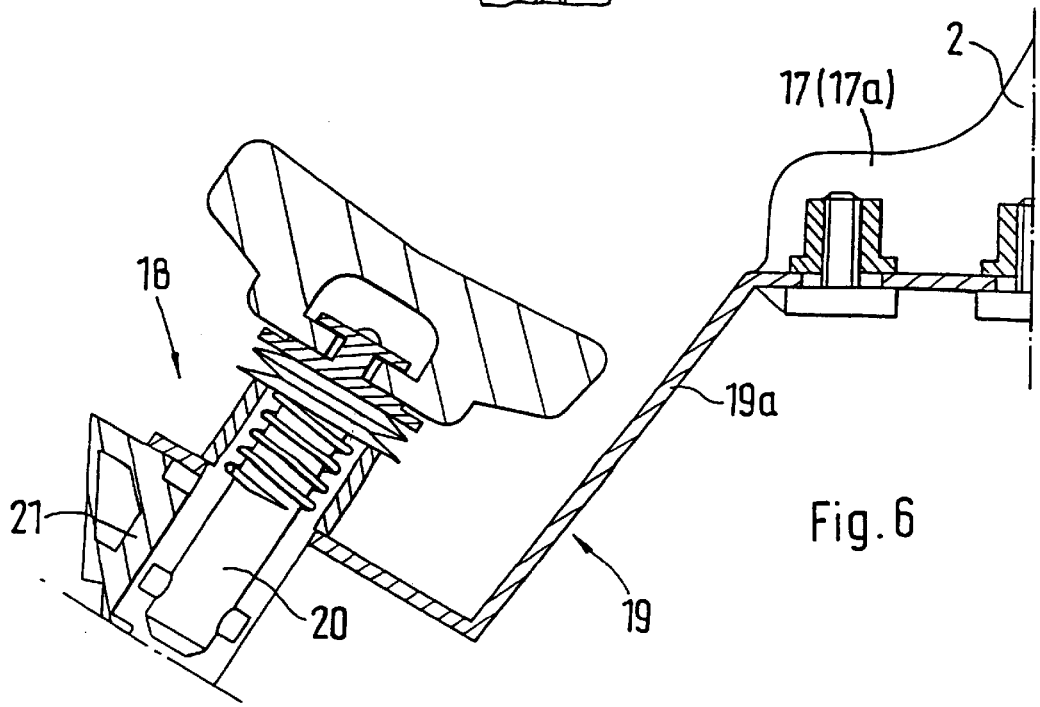
FIG. 6 is a representation of a connection between the rear mounting and the vehicle body by way of a fastening, preferably a hardtop fastening.

For the detachable connection of the scoop elements 3 and 4, these have at least one hooking connection 7 on their separating edges 5 and 6; one such hooking connection is illustrated in FIG. 5 in an enlarged manner. This hooking connection 7 comprises spaced hook elements in the form of U-shaped hook strips 8 of the one scoop element 3 and a hooking strip 9 on the other scoop element 4 which has a rectangular construction.

For the connection with the vehicle body, particularly for the insertion into a rear cutout 10 of the vehicle, the rear mounting 2 has slide-in strips 11 which are provided in sections. These slide-in strips 11 are directed to a rear cutout edge 12 of the vehicle.

The slide-in strip 11 comprises a receiving groove 13 which has a U-profile-shaped cross-section and into which the edge 14 of the rear cutout edge 12 engages and is received by the strip 11 in a clamping manner.

Figure 4:
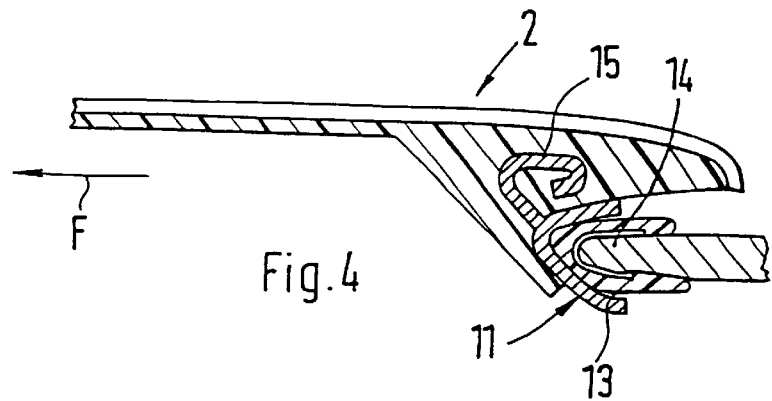
FIG. 4 is a sectional view of the slide-in strip taken along Line IV—IV of FIG. 2.

As shown in detail in FIG. 4, the slide-in strip 11 is also provided with a hook-shaped molded-on piece 15 which is used only for the holding with the scoop element during the foaming-in.

The slide-in strips 11 are provided in sections between the scoops H and H1 so that a secure fastening of the rear mounting 2 on the vehicle body, particularly in the rear cutout is ensured.

On the lateral parts 17, 17a of each scoop element 3, 4, devices are provided which permit a detachable fastening of the rear mounting 2 to the vehicle body by way of an existing fastening device 18 for a hardtop. For this purpose, the rear mounting 2 has one holding device 19 respectively which is detachably fastened by means of a fastening pin 20 on the vehicle body 21.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Detachably fastened rear mounting for a motor vehicle, said rear mounting defining two scoops arranged behind front seats of the motor vehicle, comprising:

two scoop elements which, in an in use position of the rear mounting, are connected to form a unit and can be fastened on the vehicle and which, in a transport position of the rear mounting, can be separated along a longitudinal center plane of the rear mounting so as to be individually storable in the vehicle, and a hooking connection by which the scoop elements are detachably connected with one another in the longitudinal center plane of the rear mounting, wherein the hooking connection includes spaced hooking elements having U shaped hook strips on one of said scoop elements and a spaced rear hook strip on the other scoop element.

2. Rear mounting according to claim 1, wherein the rear mounting has a slide in strip which faces a rear cutout edge of the vehicle and which accommodates an edge area of the rear cutout edge.

3. Rear mounting according to claim 2, wherein the slide in strip comprises a U profile shaped receiving groove and has a hook shaped piece molded thereon and wherein the slide in strip is constructed in one piece with the scoop element.

4. Rear mounting according to claim 2, wherein the slide in strip is provided in sections between the scoops and on an exterior area of the scoops.

5. Rear mounting according to claim 3, wherein the slide in strip is provided in sections between the scoops and on an exterior area of the scoops.

6. Rear mounting according to claim 1, wherein each of the scoop elements has one holding device on its lateral part by which the scoop elements are connected to clamp bolts securing the rear mounting to the vehicle in said in use position.

7. Rear mounting according to claim 2, wherein each of the scoop elements has one holding device on its lateral part by which the scoop elements are connected to clamp bolts securing the rear mounting to the vehicle in said in use position.

8. Rear mounting according to claim 4, wherein the slide in strip comprises a U profile shaped receiving groove and has a hook shaped piece molded thereon and wherein the slide in strip is constructed in one piece with the scoop element.

9. Rear mounting according to claim 7, wherein in said in use position, at least one of said scoop elements can be fastened on the vehicle body by the slide-in strip and one of the clamp bolts and wherein the other of said scoop elements is in said transport position in the vehicle.

10. An air deflection scoop assembly for a convertible having two seats, comprising:

a vehicle detachable rear mounting which includes a scoop element defining a pair of scoops disposed behind respective vehicle seats when in an in use position on the convertible, said rear mounting including two parts, each of which contains one of said scoops, said parts being detachably connected together so that the scoops can be separately detached from the vehicle and stowed, and a hooking connection which includes spaced hooking elements having U shaped hook strips on one of said scoop elements and a spaced rear hook strip on the other scoop element.

11. An air deflection scoop assembly according to claim 10, wherein the hooking connection detachably connects the scoop elements with one another in the longitudinal center plane of the rear mounting.

12. An air deflection scoop assembly according to claim 10, wherein the rear mounting has a slide in strip which faces a rear cutout edge of the vehicle and which accommodates an edge area of the rear cutout edge.

* * * * *